United States Patent [19]

Greenberg

[11] 4,339,967

[45] Jul. 20, 1982

[54] CABLE STRIPPER WITH PEELER

[76] Inventor: William B. Greenberg, 211 Rock Hill Rd., Bala Cynwyd, Pa. 19004

[21] Appl. No.: 243,528

[22] Filed: Mar. 13, 1981

Related U.S. Application Data

[63] Continuation-in-part of Ser. No. 75,323, Sep. 12, 1979, abandoned.

[51] Int. Cl.³ .............................................. H02G 1/12
[52] U.S. Cl. ..................................................... 81/9.51
[58] Field of Search .................... 81/9.51; 83/105, 430, 83/861, 873, 876

[56] References Cited

U.S. PATENT DOCUMENTS

| | | | |
|---|---|---|---|
| 1,751,549 | 3/1930 | Hope et al. | 83/876 X |
| 2,232,311 | 2/1941 | Bridge | 83/105 |
| 2,434,640 | 1/1948 | Burdwood | 83/430 |
| 3,817,132 | 6/1974 | Emery et al. | 81/9.51 X |

Primary Examiner—James G. Smith
Attorney, Agent, or Firm—Robert K. Youtie

[57] ABSTRACT

Apparatus for stripping sheath from cable wherein rotary cable feeding wheels include knives or cutters for longitudinally slitting the sheath, and a peeler is located to engage in a sheath slit to spread the sheath and peel the latter away from the cable core.

12 Claims, 4 Drawing Figures

CABLE STRIPPER WITH PEELER

CROSS-REFERENCES TO RELATED APPLICATIONS

This application is a continuation-in-part of my copending application Ser. No. 75,323 filed Sept. 12, 1979, now abandoned.

BACKGROUND OF THE INVENTION

In the reclaiming of materials from cable, as by stripping the insulation or jacketing, there are a wide variety of cables to be operated upon, including cables of different sizes, constructions and materials, which cables often require modification or adjustment of the stripping apparatus, or the use of entirely different apparatus. Also, prior cable stripping apparati have not been entirely satisfactory, in requiring substantial labor, as in pulling the worked sheath from the core, and in producing impure scrap as the sheath contaminates the core.

Also, current safety procedures require guards to protect operators from injury, which guards have heretofore impaired operator productivity and have added very considerably to the machine costs.

The closest prior art of which applicant is aware are U.S. Pat. Nos. 2,434,640 and 3,175,430.

SUMMARY OF THE INVENTION

It is an important object to provide cable stripping apparatus capable of operating upon a wide variety of cables, including a wide range of sizes, as well as different types and materials of construction, all without time consuming operator modifications and adjustments to the apparatus.

Further, the apparatus of the present invention provides a more satisfactory insulator stripping and spreading procedure to substantially reduce costs in separating insulation from the core material.

It is a further object of the present invention to provide a cable stripping apparatus of the type described which produces a superior insulation or jacket cutting, which together with the enhanced jacket spreading or peeling, assures quicker and more complete separation of insulation and core for cleaner scrap with less contamination of the scrap material.

It is still another object of the present invention to provide a cable stripping apparatus having the advantageous characteristics mentioned in the preceding paragraphs, which permits of greater productivity with less power requirements for substantial energy savings.

A further object of the present invention resides in the provision of novel and highly advantageous guard structures to assure safety to operators, which structures are reasonable in cost and do not impair productivity of the apparatus.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

DESCRIPTION OF THE PREFERRED EMBODIMENT

Figure 1:
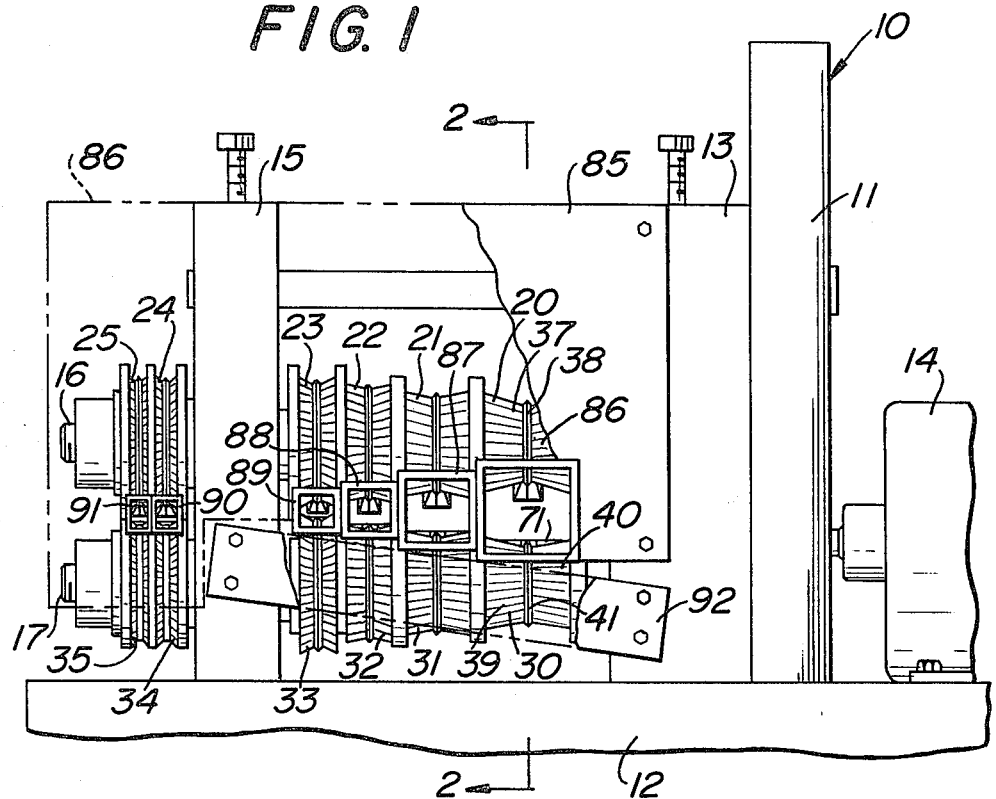
FIG. 1 is a front elevational view showing cable stripping apparatus of the present invention, partly broken away for clarity of understanding.

Referring now more particularly to the drawings, and specifically to FIG. 1 thereof, a cable stripping device is there generally designated 10, and may include a generally horizontal base 12, from which upstand a pair of upright frames or standards 13 and 15. The standards 13 and 15 are spaced from each other longitudinally of the base 12, and outward of the standard 13 may be provided a motive means or drive motor 14.

A pair of upper and lower rotary shafts 16 and 17 may extend generally horizontally, one above the other, between the standards 13 and 15, being suitably journaled therein. In practice, the lower shaft 17 may be rotatably supported in fixed journal bearings, and the upper shaft 16 may be rotatably journaled in vertically movable bearings, and the upper shaft may be yieldably urged downwardly or fixed against upward movement. One example of such shaft mounting may be seen in applicant's U.S. Pat. No. 3,951,727.

The upper shaft 16 may be provided with a plurality of cutter or feed wheels 20, 21, 22, 23, 24 and 25, all keyed to the upper shaft in side by side, coaxial alignment with each other. Simiarly, the lower shaft 17 may be provided with a plurality of cutter or feed wheels keyed to the lower shaft, as at 30,31,32,33,34 and 35. The several wheels 30, 31, 32, 33, 34 and 35 are respectively located directly below and in generally tangential relation with wheels 20, 21, 22, 23, 24 and 25, respectively. Also, each vertically aligned, generally tangential pair of wheels may be essentially similar to each other, in diameter, thickness or axial length, and configuration. For example, the wheels 20 and 30, closest to the upright or standard 13, are of the smallest diameter and greatest axial dimension or thickness. The wheels 21 and 31, respectively adjacent to and aligned with wheels 20 and 30, are of somewhat greater diameter than the latter wheels, and of less axial length or thickness. In the leftward direction, as seen in FIG. 1, the pairs of vertically aligned wheels are of increasing diameter and decreasing thickness, and leftmost pair of wheels 25 and 35, and those adjacent thereto, being 24 and 34, being outboard of standard 15 and carried by overhanging portions of shafts 16 and 17.

Further, each of the wheels 20-25 and 30-35 is formed of a pair of aligned, coaxial frusto conical sections tapering toward each other to a midregion and terminating there at an annular or circular cutter. For example, the wheel 20 may be composed of inwardly tapering frusto conical sections 36 and 37 converging toward and terminating at a circular, coaxial cutter or knife 38. Further, the conical sections 36 and 37 are advantageously roughened, ridged, or corrugated longitudinally of the shaft 16 for increased gripping engagement with a cable, as will appear presently.

Similarly, the lower aligned or mating wheel 30 is composed of a pair of frusto conical sections 40 tapering toward each other to a medial circular knife or cutter 41.

Figure 2:
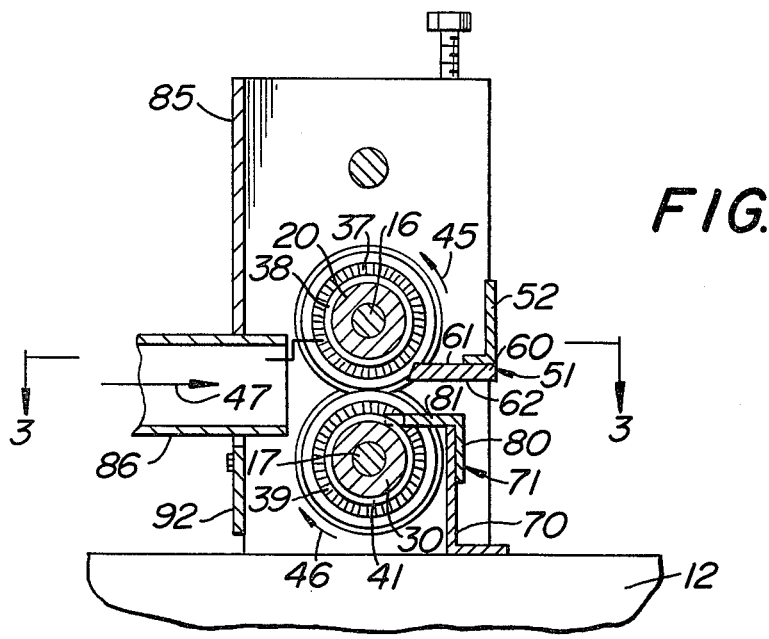
FIG. 2 is a sectional elevational view taken generally along the line 2—2 of FIG. 1.

Thus, as best seen in FIG. 1, the space between the generally tangential, vertically superposed wheels 20 and 30 is confined within the outwardly enlarging conical sections 36 and 37, and 39 and 40, so that a cable interposed between the wheels tends to center itself relative to the wheels for cutting of the cable sheath along the cable centerline by the cutters 38 and 41. Suitable transmission means are provided, as in a housing 11, transmitting motion from motor 14 to shafts 16 and 17, to effect rotation of mating wheels 20 and 30 for gripping engagement with and feeding therebetween of a cable. In FIG. 2 are shown wheels 20 and 30, their driven directions being indicated by arrows 45 and 46, and the direction of cable feed being indicated by arrow 47.

Figure 4:
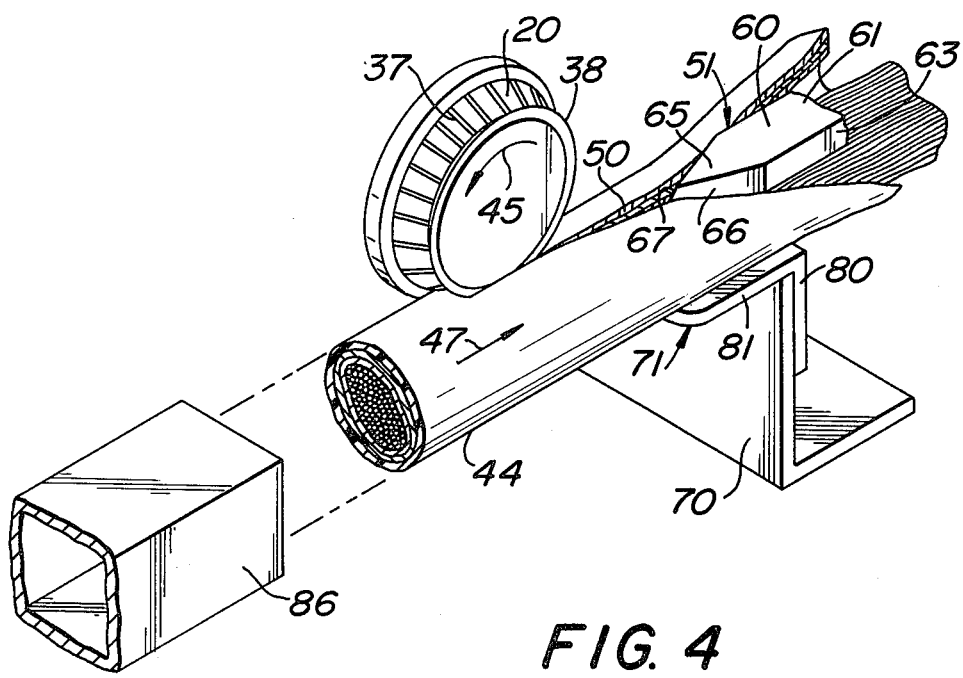
FIG. 4 is an enlarged, exploded perspective view illustrating certain operative relationships of the instant apparatus.

Similarly in FIG. 4, cable 45 moves in the direction of arrow 47 and is formed on its upper side with a longitudinally extending cut 50 formed by the cutter 38.

Thus, it will be appreciated that the wheels 20 and 30 serve to feed the cable 45 through the apparatus 10. Just downstream of the wheel 20, and generally tangent thereto at the nip or bite region with associated wheel 30, is fixed a peeler member 51. That is, a longitudinal mounting beam or angle member 52 extends in fixed relation between standards 13 and 15, downstream of the several upper wheels 20, 21, 22, 23, 24 and 25. Further, the mounting member 52 is stepped downwardly in the leftward direction or provided on its underside with successively larger mounting blocks to accommodate to the successively larger drive wheels in the leftward direction and provide mounting for respective peelers 53, 54, 55, 56 and 57 at successively lower elevations for generally tangential relation with the lower extremities of respective wheels 21, 22, 23 24 and 25. That is, each of the peelers, 51, 53, 54, 55, 56 and 57 is generally horizontal, and cooperates with its respective adjacent feeder rolls in substantially the same manner, so that a description of the single peeler 51 in detail will suffice.

As best seen in FIG. 2, the peeler 51 may extend from its mounting angle beam 52 generally horizontally upstream or toward the associated wheels 20 and 30, generally tangent to the upper wheel. The additional peelers 53-57 are located similarly with respect to associated wheels 21-25, respectively, and may be successively vertically lower, as seen in FIG. 1, say being fixed to the underside of beam 52 by suitable mounting spacers or blocks, as desired.

The peeler 51 is formed of a generally flat plate 60, of elongate configuration extending longitudinally of the path of cable movement and may have generally horizontal upper and lower substantially flat surfaces 61 and 62. Also, opposite longitudinal side edges 63 may be generally vertical, so that the major portion of peeler 51 is of elongate, generally rectangular cross-sectional configuration in a plane transverse of the direction of cable movement. The rear region of the plate 60 is suitably fixed to the mounting beam 52, and extends horizontally upstream therefrom to terminate in a free working end portion 65. The working end portion 65 tapers upstream, as between convergent side edges 66, which meet at a relatively sharp knife edge 67. The convergent side edges 66 may be chamfered, bevelled or inclined inwardly and upwardly, as between lower and upper surfaces 62 and 61, so as to define a generally symmetrical trapezoidal transverse cross section, with the upper side of less dimension than the lower side. Stated otherwise, the sharp or pointed forward end region 65 of the peeler plate 61 may be considered as tapering upwardly or flaring downwardly. Consequently, the forward meeting edge 67 of the convergent, bevelled side edges 66 lies in a generally vertical laterally medial center plane of peeler plate 60, and extends upwardly obliquely downstream as between lower and upper surfaces 62 and 61. The meeting edge 67 is relatively sharp and in alignment with the circular or annular cutter 38, so that the edge 67 engages in the cut 50 formed in the cable 45 by the cutter 38.

Figure 3:
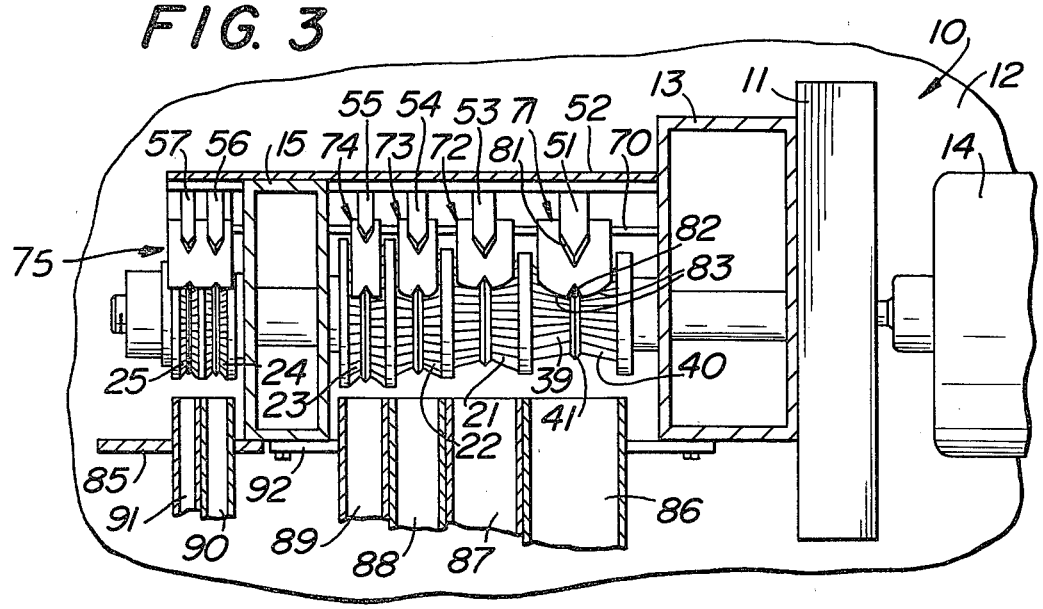
FIG. 3 is a horizontal sectional view taken generally along the line 3—3 of FIG. 2.

Below the peeler mounting beam 52, say extending along the base plate 12, and suitably fixed thereto may be an anvil mounting bracket or angle piece 70 upstanding along the downstream side of the several lower feed wheels 30-35. An anvil or backing member 71 may be fixed to the upstanding mounting piece 70, directly beneath the peeler 51, and extend upstream in approximately tangential relation with adjacent lower feed wheel 30. Similarly, laterally leftward of the backing member or anvil 71, directly beneath the several peeler 53-57 are respective generally horizontal backing members or anvils 72, 73, 74 and 75, projecting upstream generally tangential to their respective adjacent lower feed wheels 31-35. As best seen in FIG. 3, a single anvil 75 may be employed in association with the pair of leftmost feed wheels 34 and 35, as by their relatively narrow dimensions. As all of the backing members or anvils 71-75 may be essentially similar, a detailed description of the anvil 71 will suffice. In FIG. 2 it will be seen that the anvil 71 may include a generally vertical or depending portion 80 which may be suitably fixed, as by welding or otherwise, to the upstanding mounting bracket 70. From the upper end of the depending portion 80, the anvil may include a generally horizontally disposed plate 81 projecting upstream of the cable path, generally tangential to and toward the adjacent lower feed wheel 30, terminating proximate to but short of the vertical plane of the feed wheel axes. Thus, the backing member or anvil extends upstream from its mounting bracket 70 and closely approaches a tangential relationship with the upper side of lower feed wheel 30. This closely approached tangential relationship is enabled by the upstream edge of plate portion 81 having a center notch 82 to spacedly receive the rotary circular cutter 41, the forward edge extending from the notch laterally outwardly and upstream, as at 83 on opposite sides of the notch in general accommodation to the conical feed wheels section 39 and 40.

Thus, the upper peeler 51 and nether anvil 71 are generally in vertically spaced parallel relation with each other, being approximately tangent to the underside of upper wheel 20 and upper side of lower wheel 30.

On the upstream side of the apparatus 10, say extending between the standards 13 and 15 may be a mounting plate 85, shown as broken away in FIG. 1 and illustrated in phantom by dot-and-dash line 86. Thus, the mounting plate 85 extends laterally outwardly beyond standard 15 and wheels 24, 25, 34 and 35. In alignment with the nip, bite or adjacent regions of each pair of vertically aligned feed wheels, there is disposed a horizontal feeding guard, cable support or conduit for conducting cable to be stripped. The tubular guards, guides or tubes are each of generally rectangular cross-sectional configuration, and specifically advantageously of square cross-sectional configuration for use with cable of round or circular circumferential configuration, the square tubes having horizontal lower and upper walls and vertical sides. A relatively large tubular guard or conduit 86 is disposed generally horizontally in alignment with the adjacent regions of cooperating feed rolls 20 and 30, extending upstream therefrom. Similarly, a slightly smaller generally rectangular tubular guard or conduit 87 extends horizontally upstream from the adjacent regions of feed wheels 21 and 31; and similarly, successively smaller, generally square cross-sectional tubular guards or conduits 88, 89, 90 and 91 extend generally horizontally upstream from the adjacent tangential regions of respective pairs of feed wheels 22 and 32, 23 and 33, 24 and 34, and 25 and 35. The several guards 86–91 may all be mounted in position by welding or other securement to the mounting plate 85, the latter serving together with the tubular guards as an effective safety shield preventing injury to operators of the apparatus. An additional reinforcing member or bar 92 may extend between standards 13 and 15, directly below and in supporting engagement with the undersides of tubular guards 86–89.

Thus, cable of a wide range of size may be fed into an appropriately sized tubular conduit or guard 86–91 for entry therefrom into the nip or bite of the associated feeding wheels. The advantage of the square cross section of tubular guards is that a cut end of cable may be accommodated in an appropriately sized tubular guard extending diagonally thereacross. That is, the cut end by the shearing action is generally of a greater dimension than the cable diameter, for accommodation by the diagonal dimension of the square tubular guard. Each of the tubular guides or guards 86–91 serves by its bottom wall to support against gravity a cable being fed to the nip of the associated feed wheels, while the guide side walls may laterally constrain the cable being fed.

The infed cable 45 is effectively gripped by the corrugated conical sections of the feeding wheels, as at 37 and 39 in FIG. 2. The cable is thereby fed through the wheels while simultaneously having its insulation or jacket longitudinally cut at diammetrically opposed regions along its upper and lower sides, the upper cut being shown at 50 in FIG. 4 being made by the cutter 38. The feed wheels 20, 30 forcibly feed the cable downstream between the generally parallel upper peeler 51 and lower anvil 71, the peeler and anvil serving to effectively strip or prevent winding of cable about a feed wheel. At the same time, the peeler 51 engages well into the cut 50, the peeler upstream edge insuring full cutting of the insulation from the interior thereof, by the upwardly oblique downstream inclination of the edge 67. Further, the downstream flaring side edges 66, and their upward convergence effectively spread apart the severed upper region of the insulation for separation of the latter from the core.

The cable exiting from its generally horizontal, tangential relation in the nip of feeder wheels tends to follow one of the wheels, the upper feeder wheel in the illustrated embodiment where the tubular guides support the infeeding cable against gravity and at a sufficient elevation to assure a tendency of the cable toward upward bending movement, which further assures of effective peeling by the associated peeler.

Of course, each of the several stations operate in the same manner, being sized to accommodate to different size cable. There is no limit to the cable length capable of being stripped, so long as the worked cable is conveyed away.

From the foregoing, it is seen that the present invention provides a cable stripping apparatus which is extremely simple in construction, durable and reliable throughout a long useful life, highly effective in operation to reduce costs and time, and otherwise fully accomplishes its intended objects.

Although the present invention has been described in some detail by way of illustration and example for purposes of clarity of understanding, it is understood that certain changes and modifications may be made within the spirit of the invention.

What is claimed is:

1. Apparatus for stripping sheath from cable, comprising upper and lower feeder wheels for engaging upper and lower sides of a cable to effect endwise cable feeding, said feeder wheels each being of decreasing diameter from opposite ends toward the middle to define a symmetrical peripheral concavity to laterally constrain the cable being fed, a circular cutter fixed coaxially on each of said feeder wheels at the minimum diameter of the peripheral concavity for cutting into diametrically opposite sides of the cable sheath, a sheath peeler located downstream of and in alignment with the cutter of the upper feeder wheel for entry through a cut in the upper side of said sheath to peel the sheath from the remainder of the cable, and a support upstream from said feeder wheels for supporting cable against gravity during feeding between said wheels to effect outward and upward cable feeding from between said wheels into sheath peeling engagement with said sheath peeler.

2. Apparatus according to claim 1, said peeler comprising a plate disposed in a plane generally parallel to the axes of said wheels and having a pair of surfaces diverging from a knife edge in both the directions downstream of and toward the cable for engaging in and beneath the cut of and spreading the cable sheath.

3. Apparatus according to claim 2, the cable exiting from said feeder wheels tending to follow the upper of said wheels, and said peeler being located on the same side of the cable as said upper wheel.

4. Apparatus according to claim 3, in combination with an anvil located downstream of said wheels on the opposite side of said cable as said peeler for maintaining the peeler in the cable cut.

5. Apparatus according to claim 2, said peeler knife edge being generally coplanar with said cutters.

6. Apparatus according to claim 5, said knife edge extending obliquely upstream toward said cable and terminating in a point for spreading engagement beneath the cable sheath.

7. Apparatus according to claim 5, in combination with an anvil fixed in position on the other side of said cable opposite to said plate to maintain the cable in position toward the plate.

8. Apparatus according to claim 7, said plate and anvil extending between and spaced downwardly from the axes of said feeder wheels, said anvil being cut away to accommodate a cutter.

9. Apparatus according to claim 7, said anvil being generally tangent to the other of said cutters.

10. Apparatus according to claim 7, said plate and anvil extending between said feeder wheels, said anvil being cut away to accommodate a cutter.

11. Apparatus according to claim 1, said support comprising a guide conduit upstream of said feeder wheels and opening toward the bite of said wheels for guiding a cable between said wheels, said guide conduit being of generally square cross section to accommodate a flattened cable cut extending generally oblique in said guide conduit.

12. In a cable stripping apparatus having an inlet for receiving the cut end of a cable to be stripped, the improvement comprising a generally horizontal guide conduit located with an inlet end upstream of said cable inlet and an outlet end opening to said cable inlet for horizontally supporting against gravity a cable being fed, said guide conduit being of closed rectangular cross section to accommodate a flattened cable cut extending obliquely in said guide conduit, said guide conduit being of generally square cross section for accommodating a flattened cable cut in alternate diagonal positions.

* * * * *